(12) United States Patent
Molaison

(10) Patent No.: US 8,057,579 B2
(45) Date of Patent: Nov. 15, 2011

(54) METHOD, APPARATUS, AND SYSTEM FOR ACID GAS REMOVAL

(75) Inventor: Jennifer Lynn Molaison, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 12/268,206

(22) Filed: Nov. 10, 2008

(65) Prior Publication Data

US 2010/0116129 A1    May 13, 2010

(51) Int. Cl.
*B01D 53/52* (2006.01)
*B01D 53/62* (2006.01)

(52) U.S. Cl. ............. 95/215; 95/235; 95/236; 423/226; 96/290

(58) Field of Classification Search ............ 95/211, 95/235, 236, 49, 51, 187, 210, 213, 215; 96/8, 290, 296; 423/226, 228, 229; 261/100
See application file for complete search history.

(56) References Cited

U.S. PATENT DOCUMENTS

| | | | | |
|---|---|---|---|---|
| 4,036,760 A * | 7/1977 | Bardonnet et al. | .......... | 210/323.1 |
| 4,699,637 A * | 10/1987 | Iniotakis et al. | ................ | 96/10 |
| 4,750,918 A * | 6/1988 | Sirkar | .............. | 95/44 |
| 5,281,254 A * | 1/1994 | Birbara et al. | .................... | 95/44 |
| 5,749,941 A | 5/1998 | Jansen et al. | | |
| 5,928,409 A | 7/1999 | Sirkar | | |
| 6,197,269 B1 * | 3/2001 | Jansen et al. | ............. | 423/243.01 |
| 6,228,145 B1 | 5/2001 | Falk-Pedersen et al. | | |
| 6,402,818 B1 | 6/2002 | Sengupta | | |
| 6,582,496 B1 | 6/2003 | Cheng et al. | | |
| 6,596,780 B2 * | 7/2003 | Jahnke et al. | ................ | 518/700 |
| 6,786,050 B1 * | 9/2004 | Okada et al. | .................... | 60/780 |
| 6,805,731 B2 * | 10/2004 | Cheng et al. | ......................... | 96/8 |
| 6,926,829 B2 | 8/2005 | Dannström et al. | | |
| 7,544,340 B2 * | 6/2009 | Jamal et al. | .................. | 423/220 |
| 7,592,318 B2 * | 9/2009 | Serrero | ...................... | 514/44 R |
| 2007/0286783 A1* | 12/2007 | Carrette et al. | ............... | 423/228 |
| 2008/0078294 A1* | 4/2008 | Adamopoulos | ................ | 95/235 |

* cited by examiner

*Primary Examiner* — Frank Lawrence, Jr.
(74) *Attorney, Agent, or Firm* — Fletcher Yoder

(57) ABSTRACT

A method and apparatus are provided for absorbing acid gases from a synthesis gas prior to combustion. In one embodiment, a vessel is provided for receiving a synthesis gas and a physical solvent. The vessel includes one or more membrane contactors that provide an interface for physical absorption of one or more acid gases from the synthesis gas into the physical solvent.

18 Claims, 3 Drawing Sheets

METHOD, APPARATUS, AND SYSTEM FOR ACID GAS REMOVAL

BACKGROUND OF THE INVENTION

The subject matter disclosed herein relates to removal of acid gas from synthesis gas (syngas) and more specifically, to removal of acid gases using membrane contactors.

Syngas may be produced by the gasification of a feedstock, such as coal, and may be utilized as fuel in a combined cycle power plant. The syngas may generally include a gaseous mixture of carbon monoxide and hydrogen, as well as small amounts of hydrogen chloride, hydrogen fluoride, ammonia, and other gases. Depending on the organic content of the feedstock, the syngas also may include varying amounts of acid gases, such as hydrogen sulfide and carbon dioxide. To reduce air pollution and environmental costs, the syngas may need to be cleaned, or "sweetened," to remove the acid gases prior to combustion within a combined cycle power plant.

BRIEF DESCRIPTION OF THE INVENTION

In one embodiment, an apparatus includes a vessel configured to receive a synthesis gas and a physical solvent. The apparatus also includes one or more membrane contactors disposed in the vessel and configured to provide an interface for physical absorption of one or more acid gases from the synthesis gas into the physical solvent.

In another embodiment, a method includes absorbing two or more acid gases from a synthesis gas into a physical solvent in a single unit operation prior to combustion of the synthesis gas. The absorbing includes absorbing the acid gases through one or more membrane contactors disposed between the synthesis gas and the solvent.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for removing acid gases from syngas prior to combustion. In accordance with certain embodiments, the syngas may be directed through an absorption unit with membrane contactors that provide a surface area for a physical solvent to physically absorb the acid gases from the syngas in a single unit operation to produce sweetened syngas. As used herein, the term "acid gases" includes the acid gases hydrogen sulfide and carbon dioxide as well as other sulfur containing compounds. The term "physical absorption" shall mean absorption through a solvent that absorbs the selected component from the syngas stream by physical characteristics and not through a chemical reaction. Physical absorption may be particularly well-suited to pre-combustion acid gas removal due to the relatively high pressure that exists before combustion. For example, gasification of feedstock may occur at elevated pressures and temperatures. Consequently, the syngas produced by the gasification process may exist at an elevated pressure, for example a pressure greater than or equal to about 8 bar. Other examples of elevated pressures, include, but are not limited to, pressures ranging from approximately 8 bar to 31 bar. At elevated pressures, the absorption capacity of physical solvents may increase, and therefore physical absorption may provide increased efficiencies for pre-combustion applications. Further, the use of membrane contactors may provide increased surface area for absorption, which may in turn reduce the size of the absorption unit and the quantity of the physical solvent.

Figure 1:
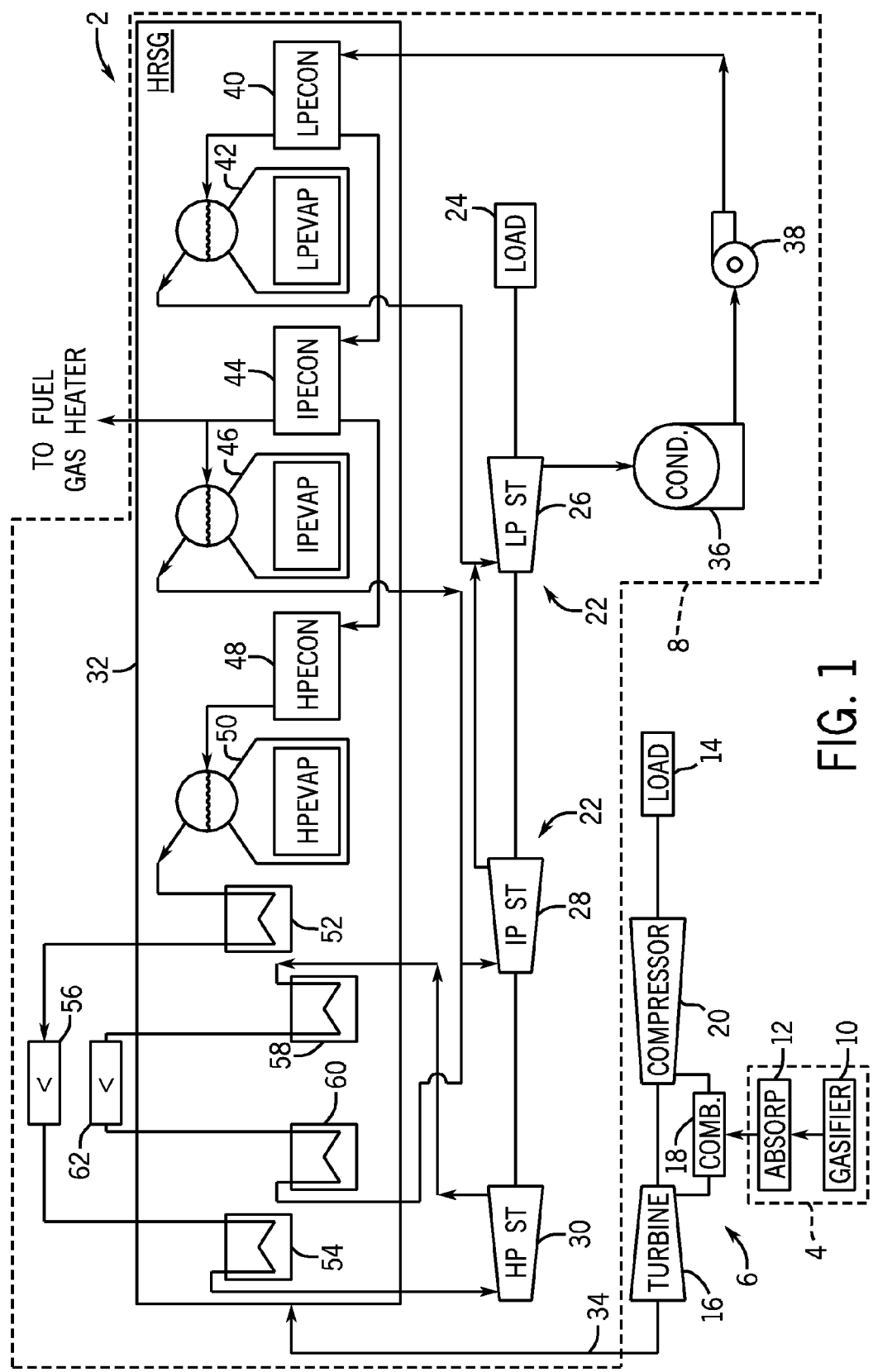
FIG. 1 is a schematic flow diagram of an embodiment of a combined cycle power generation system having a pre-combustion system supplying syngas, a gas turbine, a steam turbine, and a heat recovery steam generation system.

FIG. 1 is a schematic flow diagram of an embodiment of a combined cycle power generation system 2 that includes a unique pre-combustion system 4 for acid gas removal. As discussed further below, the pre-combustion system 4 may include one or more membrane contactors for removing acid gases from syngas before the syngas is applied to a gas turbine 6. Within the gas turbine 6, the sweetened syngas may be combusted to generate power within a "topping," or Brayton, cycle. Exhaust gas from the gas turbine 6 may be supplied to a post-combustion system 8 to generate steam within a "bottoming," or Rankine, cycle. In certain embodiments, the pre-combustion system 4, the gas turbine 6, and the post-combustion system 8 may function together as an integrated gasification combined cycle (IGCC) power plant.

The pre-combustion system 4 includes a gasifier 10 that generates syngas and an absorption unit 12 that removes acid gases from the syngas. The gasifier 10 may be any suitable type of gasifier, such as a fixed bed, fluidized bed, or entrained flow gasifier. As described further below with respect to FIG. 4, the absorption unit 12 may include one or more membrane contactors for physically absorbing acid gases from the syngas into a physical solvent. Of course, the pre-combustion system 4 also may include additional equipment such as filters, scrubbers, heat exchangers, reactors, and the like. Further, the pre-combustion system 4 may include equipment and materials used in the gasification process such as piping, one or more gasifiers, feedstock, tanks, combustors, char, boilers, scrubbers, mills, coolers, clarifiers, and other associated equipment and materials.

The syngas from the pre-combustion system 4 may then be applied to the gas turbine 6 to drive a first load 14 using a turbine 16. The first load 14 may, for instance, be an electrical generator for producing electrical power. The gas turbine 6 may include a turbine 16, a combustor or combustion chamber 18, and a compressor 20. The exhaust gas from the gas turbine 6 may be supplied to the post-combustion system 8 where the exhaust gas may be recovered using a heat recovery steam generation (HRSG) system and applied to a steam turbine 22 for driving a second load 24. The second load 24 may also be an electrical generator for generating electrical power. However, both the first and second loads 14 and 24 may be other types of loads capable of being driven by the gas turbine 6 and the steam turbine 22. In addition, although the gas turbine 6 and the steam turbine 22 may drive separate loads 14 and 24, as shown in the illustrated embodiment, the gas turbine 6 and the steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 6, may be implementation-specific and may include any combination of sections.

The post-combustion system 8 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 6 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON) where it may be heated. In certain embodiments, the low-pressure economizer 40 may be a device configured to heat feedwater with gases. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure section 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 6. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely illustrative of a general power generation system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 2, hot exhaust may flow from the gas turbine 6 and pass through the HRSG 32 and may be used to generate high-pressure, high-temperature steam. The steam produced by the HRSG 32 may then be passed through the steam turbine 22 for power generation. In addition, the produced steam may also be supplied to any other processes where superheated steam may be used. For example, in certain embodiments, some, or all of, the steam may be supplied to the pre-combustion system 4 to regenerate the physical solvent used in the absorption unit 12. The gas turbine 6 generation cycle is often referred to as the "topping cycle," whereas the steam turbine 22 generation cycle is often referred to as the "bottoming cycle." By combining these two cycles as illustrated in FIG. 1, the combined cycle power generation system 2 may lead to greater efficiencies in both cycles. In particular, exhaust heat from the topping cycle may be captured and used to generate steam for use in the bottoming cycle. Of course, the combined cycle power generation system 2 is provided by way of example only and is not intended to be limiting. The pre-combustion acid gas removal techniques may be used to provide sweetened syngas for any suitable application. For example, the pre-combustion system 4 may be used to supply sweetened syngas to a gas turbine without an HRSG system.

Figure 2:
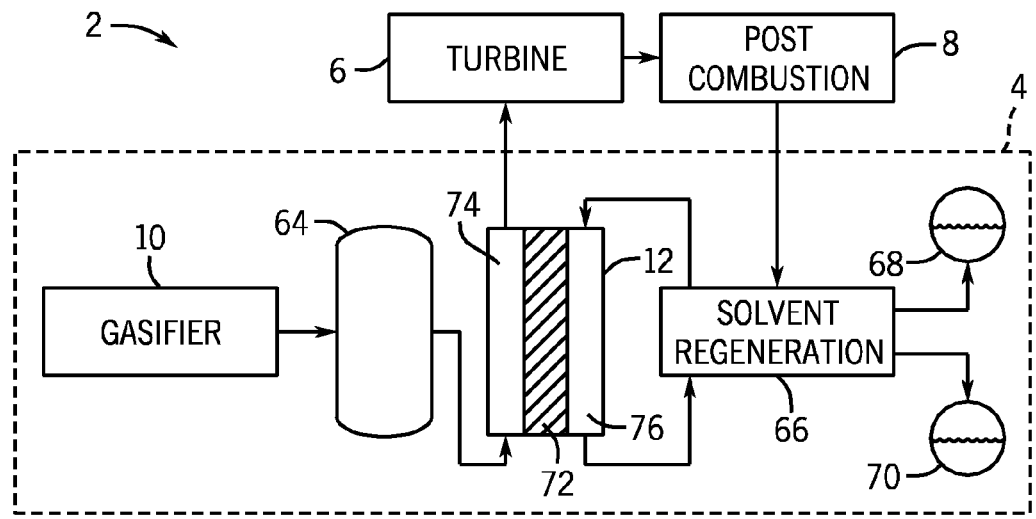
FIG. 2 is a schematic flow diagram detailing an embodiment of the pre-combustion system of FIG. 1.

FIG. 2 is a schematic flow diagram of the combined cycle system 2 illustrating an embodiment of the pre-combustion system 4. As discussed above with respect to FIG. 1, the pre-combustion system 4 includes the gasifier 10 that converts carbonaceous materials, such as coal, into syngas consisting primarily of carbon monoxide and hydrogen. The syngas from the gasifier 10 may be supplied to a reactor 64 that may be used to carry out a water gas shift reaction to convert carbon monoxide within the syngas to carbon dioxide. In certain embodiments, a catalyst may be used to lower the reaction temperature. Further, additional reactors may be included within the pre-combustions system 4 to perform additional purification steps such as hydrolyzing carbonyl sulfide into carbon dioxide and hydrogen sulfide. The gas exiting the reactor 64 may include a gaseous mixture of carbon dioxide, hydrogen, and hydrogen sulfide, as well as trace amounts of other gases and entrained soot and ash. In certain embodiments, one or more filters may be included within the pre-combustion system 4 to remove the entrained soot and ash and other trace gaseous components.

From the reactor 64, the syngas may enter the absorption unit 12 where the syngas may be sweetened by removing acid gases, such as carbon dioxide and hydrogen sulfide. Specifically, a solvent within the absorption unit 12 may selectively absorb acid gases from the syngas. The solvent may be any physical solvent selective to acid gases. For example, the solvent may be a mixture of dimethyl ethers of polyethylene glycol, such as Selexol, commercially available from Dow Chemical Company of Midland, Mich. In certain embodiments, the syngas and/or the solvent may be maintained at elevated pressures within the absorption unit 12. For example, the solvent may have a pressure ranging from approximately 20 bar to approximately 140 bar, as well as all subranges therebetween. The syngas may have a pressure ranging from approximately 8 bar to approximately 100 bar, or more specifically, from approximately 10 bar to approximately 85 bar, or, even more specifically from approximately 10 bar to approximately 20 bar, as well as all subranges between approximately 8 bar and approximately 100 bar. The solvent containing the acid gases, referred to as the rich solvent, may enter a solvent regeneration system 66 where the acid gases may be desorbed from the solvent and stored in receivers 68 and 70. Specifically, the carbon dioxide may be separated from the solvent and transferred to the receiver 68 where it may undergo a subsequent recovery process. For example, the carbon dioxide may be recovered and used for enhanced oil recovery or for urea production. The hydrogen sulfide may be directed to the receiver 70 where it may undergo further processing. For example, the hydrogen sulfide may be recovered and used in the production of gypsum.

The solvent regeneration system 66 may employ temperature or pressure gradients to desorb the acid gases from the solvent. For example, the solvent regeneration system 66 may employ a stripper that uses heat generated using steam from the post-combustion system 8. In another example, the solvent regeneration system 66 may employ pressure gradients within a flash operation to separate the acid gases from the solvent. After the acid gases have been desorbed, the solvent may be relatively free of acid gases, and may return to the absorption unit 12 as a lean solvent ready to absorb acid gases from the syngas.

In general, the absorption unit 12 may facilitate the removal of acid gases, such as hydrogen sulfide and carbon dioxide, in a single unit operation. The absorption unit 12 may include one or more membrane contactors 72 that provide an interface between the syngas and the solvent. In certain embodiments, the acid gases within the syngas may flow through the membrane contactors 72 and be absorbed into the solvent. An interior volume 74 may retain the syngas and an interior volume 76 may retain the solvent. The membrane contactors 72 may be disposed between the two volumes 74 and 76 to provide an interface for absorption. In certain embodiments, the volume 76 retaining the solvent may be maintained at a higher pressure than the volume 74 retaining the syngas. The pressure difference may be small enough to allow the syngas to permeate the membrane contactors 72 but large enough to impede the flow of syngas from the syngas volume 74 into the solvent volume 76. In certain embodiments, a pressure regulator may be included within the absorption unit 12 to monitor the pressure difference. Acid gases within the syngas may pass through the membrane contactors 72 and be absorbed into the solvent within the volume 76, while the syngas remains within the volume 74. In this manner, the membrane contactors 72 may provide both a surface area for absorption and a barrier between the syngas and the solvent. Further, the membrane contactors may provide an increased surface area for absorption, which in turn may allow for a reduction in equipment size, capital costs, and solvent quantities. As discussed above, the sweetened syngas may exit the absorption unit 12 and may be supplied to the turbine 6, while the solvent, rich in absorbed acid gases, may be provided to the solvent regeneration system 66.

The sweetened syngas exiting the absorption unit 12 may consist primarily of hydrogen and may be supplied to the gas turbine 6 to drive one or more loads. As described above with respect to FIG. 1, the exhaust gas from the gas turbine 6 may be applied to the post combustion system 8 where the exhaust gas may be recovered and used to provide steam for powering another load through a steam turbine. Further, the steam generated in the post combustion system 8 may be supplied to the solvent regeneration system 66 to provide heat for desorption of the acid gases from the solvent.

Figure 3:
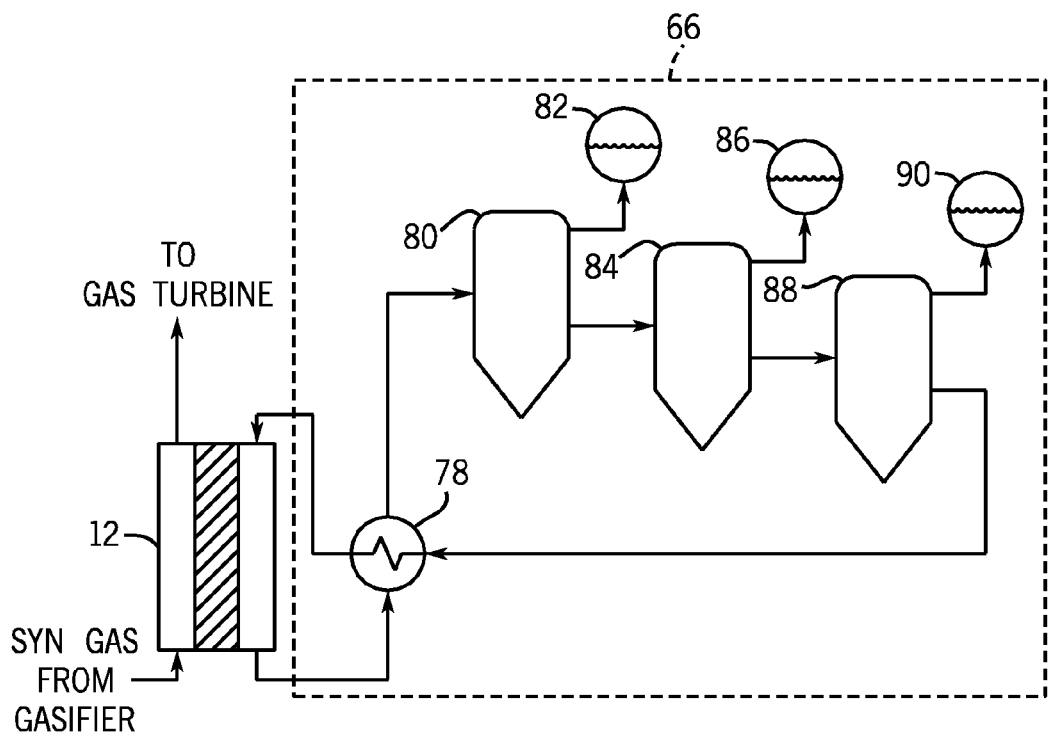
FIG. 3 is a schematic flow diagram detailing an embodiment of a solvent regeneration system that may be employed in the combined cycle power generation system shown in FIG. 2.

FIG. 3 is a schematic diagram of one embodiment of the solvent regeneration system 66. The system 66 may include a heat exchanger 78 that receives the solvent rich in acid gases from the absorption unit 12. As the rich solvent flows through the heat exchanger 78, the rich solvent may absorb heat from the lean solvent returning to the absorption unit 12. The rich solvent may then exit the heat exchanger 78 and be flashed in a high pressure flash tank 80 to remove carbon dioxide from the rich solvent. The removed carbon dioxide may be stored within a receiver 82 where it may be held until further processing. The solvent may then enter a medium pressure flash tank 84 and be flashed to remove carbon dioxide and hydrogen sulfide from the solvent. The removed mixture of carbon dioxide and hydrogen sulfide may be stored within a receiver 86 for further processing. The solvent may then be directed to a low pressure flash tank 88 and be flashed to remove hydrogen sulfide from the solvent. The removed hydrogen sulfide may be stored within a receiver 90. The solvent may then exit the flash tank 88 as a lean solvent, relatively free from acid gases. The lean solvent may flow through the heat exchanger 78 and transfer heat to the rich solvent flowing through the heat exchanger from the absorption unit 12. After exiting the heat exchanger 78, the lean solvent may reenter the absorption unit 12 where it may again absorb acid gases.

Of course, the solvent regeneration system 66 is provided by way of example and is not intended to be limiting. For example, any number of flash tanks and receivers may be included and configured to operate at various pressures. In one example, the high pressure flash tank 80 may operate at about 10 bar, the medium pressure flash tank 84 may operate at about 5 bar, and the low pressure flash tank may operate at about 1 bar. As may be appreciated, the pressures of the flash tanks may vary depending on a variety of factors, including, but not limited to, the temperatures of the flash tanks, the number of stages, and the purity desired. In other embodiments, the receivers 82, 86, and 90 may be eliminated to allow desorbed acid gases to flow directly to subsequent processing operations. Further, in other embodiments, the solvent regeneration system 66 may employ a stripper that uses heat instead of pressure gradients to desorb the acid gases from the solvent.

Figure 4:
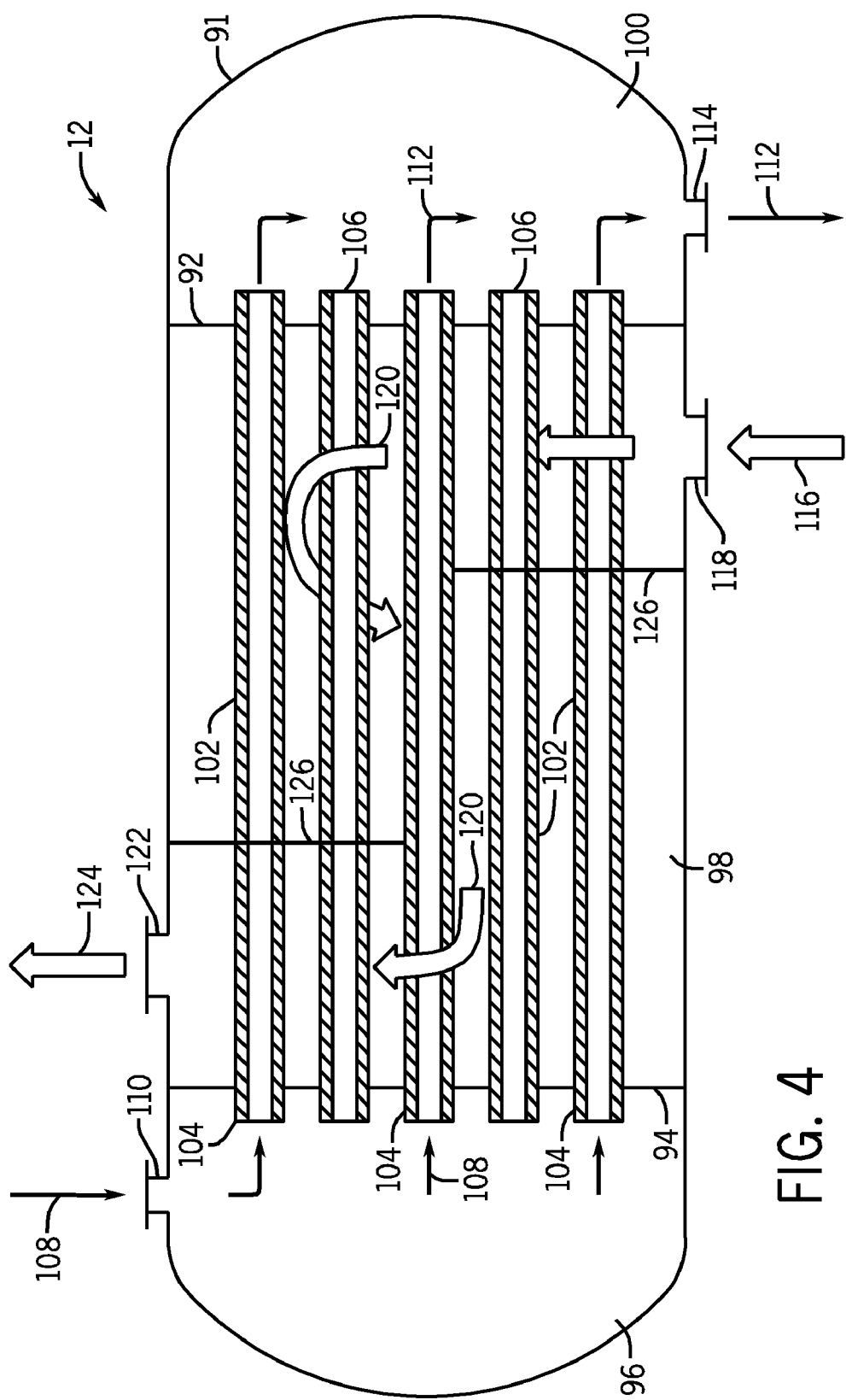
FIG. 4 is a cross sectional view of an embodiment of an absorption unit that may be used in the pre-combustion system shown in FIG. 1.

FIG. 4 is a cross sectional view of an exemplary physical absorption unit 12 that may be used to selectively remove acid gases from syngas. The physical absorption unit 12 may be housed within a vessel 91 that may be constructed of metal, solid polymer, or other suitable inert material. The vessel 91 may include dividers 92 and 94 that separate the interior of vessel 91 into three interior volumes 96, 98, and 100. Membrane contactors 102 may pass through the interior volume 98 to fluidly connect the interior volumes 96 and 100.

The membrane contactors 102 may include a membrane 104 disposed around a support 106. In certain embodiments, the support 106 may include a relatively small diameter polymer or wire mesh tube with an inner flow passage for transporting syngas from interior volume 96 to interior volume 100. However, in other embodiments, the support 106 may include a structure with an inner flow passage of various geometries. For example, the support 106 may have a rectangular, oval, circular, star-shaped, or trapezoidal cross-section. The membrane 104 may include an expanded polytetrafluoroethylene (ePTFE) membrane disposed around the outer surfaces of the support 106. However, in other embodiments, the membrane 104 may be constructed of a polymeric porous material, such as a thermoplastic polymer, or any other suitable porous material. In certain embodiments, the membrane 104 may have a wall thickness ranging from approximately 0.1 microns to approximately 2 millimeters and all subranges therebetween. More specifically, the membrane 104 may have a wall thickness ranging from approximately 0.5 microns to 1.5 microns or, even more specifically, from approximately 0.8 microns to 1.2 microns. Further, in other embodiments, the membrane 104 may have a wall thickness greater than approximately 2 millimeters.

In operation, syngas, (arrow 108) from the gasification unit may enter the vessel 91 through an inlet 110 and flow into the inner volume 96. From the inner volume 96, the syngas 108 may flow within the membrane contactors 102 to pass through the inner volume 98. As the syngas 108 flows through the membrane contactors 102, acid gases within the syngas may be absorbed through the support 106 and the membrane 104 into the solvent flowing within the inner volume 98. The syngas may then exit the membrane contactors 102 as sweetened syngas (arrow 112) and flow into the inner volume 100. From the inner volume 100, the sweetened syngas 112 may exit through an outlet 114 and be directed to a gas turbine as described above with respect to FIG. 1.

The solvent (arrow 116) may enter the inner volume 98 through an inlet 118. After entering the inner volume 98, the solvent (arrow 120) may flow within the inner volume 98 and contact the membranes 104. As the solvent contacts the membranes 104, the solvent 120 may absorb acid gases from the syngas flowing through the membrane contactors 102. The solvent may then exit through an outlet 122 as a rich solvent (arrow 124) containing absorbed acid gases. As discussed above, the membranes 104 may provide a surface area and interface between the syngas 108 flowing with the membrane contactors 102 and the solvent 120 flowing around the membrane contactors 102. In certain embodiments, the membrane contactors 102 may be arranged to maximize the surface area of the interface between the syngas 108 and the solvent 120. Further, baffles 126 may be provided within the interior volume 98 to direct the flow of the solvent 120 within the volume 98. For example, the baffles 126 may be arranged to route the solvent back and forth about the membrane contactors 102 to increase the contact surface area, which in turn may increase the efficiency of the absorption unit 12.

As may be appreciated, the configuration of the absorption unit 12 shown in FIG. 4 is provided by way of example only and is not intended to be limiting. For example, the numbers and relative shapes and sizes of the vessel 91, volumes 96, 98, and 100, supports 106, and membrane contactors 102 may vary. Further, any number of baffles and/or interior volumes may be provided within the vessel 91. Moreover multiple absorption units 12 may be operated in series and/or in parallel within the pre-combustion system 4.

Technical effects of the invention include providing a single operation that can selectively remove acid gases from syngas prior to combustion. Further, the membrane contactors may provide increased surface area for contact between the syngas and the solvent which may reduce equipment size, thus requiring less solvent and reducing operational costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus comprising:
   a single vessel configured to receive a synthesis gas and a physical solvent, wherein the single vessel comprises an absorption unit;
   one or more membrane contactors disposed in the single vessel and each comprising a physical absorption membrane configured to provide an interface for physical absorption of carbon dioxide and hydrogen sulfide from the synthesis gas into the physical solvent;
   a solvent regeneration unit configured to remove the carbon dioxide and the hydrogen sulfide from the physical solvent; and
   a heat recovery generation system configured to convert exhaust gas discharged from a gas turbine to steam for the solvent regeneration unit.

2. The apparatus of claim 1, wherein the physical solvent comprises a mixture of dimethyl ethers of polyethylene glycol.

3. The apparatus of claim 1, wherein each physical absorption membrane of the one or more membrane contactors comprises a thermoplastic polymer.

4. The apparatus of claim 1, wherein each physical absorption membrane of the one or more membrane contactors is disposed around a porous tubular support configured to receive a flow of the synthesis gas within the support and a flow of the solvent over the physical absorption membrane.

5. The apparatus of claim 4, wherein each physical absorption membrane comprises expanded polytetrafluoroethylene, and wherein each porous tubular support comprises a hollow wire mesh tube.

6. The apparatus of claim 1, comprising dividers configured to divide the single vessel into a first volume configured to receive the synthesis gas, a second volume configured to receive the solvent, and a third volume configured to receive the synthesis gas; and wherein each of the one or more membrane contactors extends through the first volume, the second volume, and the third volume to provide a passageway for the synthesis gas to flow from the first volume through the second volume to the third volume.

7. The apparatus of claim 6, comprising baffles disposed within the second volume to direct the flow of the solvent in a nonlinear path within the second volume.

8. A method comprising:
directing a first stream comprising synthesis gas, carbon dioxide, and hydrogen sulfide into a single physical absorption vessel comprising one or more membrane contactors, wherein the one or membrane contactors each comprise a physical absorption membrane;
absorbing carbon dioxide and hydrogen sulfide from the first stream into a physical solvent in a single unit operation within the single physical absorption vessel prior to combustion of the synthesis gas, wherein the absorbing comprises absorbing the carbon dioxide and the hydrogen sulfide into the physical solvent through the one or more membrane contactors to produce a rich solvent stream containing the carbon dioxide and the hydrogen sulfide and a sweetened synthesis gas stream, wherein the one or more membrane contactors are disposed between the synthesis gas and the solvent;
combusting the sweetened synthesis gas within a gas turbine;
directing the rich solvent stream to a solvent regeneration unit to remove the carbon dioxide and the hydrogen sulfide from the rich solvent stream; and
converting, within a heat recovery generation system, exhaust gas discharged from the gas turbine to steam for the solvent regeneration unit.

9. The method of claim 8, wherein each physical absorption membrane comprises expanded polytetrafluoroethylene.

10. The method of claim 8, wherein the synthesis gas has a pressure greater than or equal to approximately 8 bar.

11. The method of claim 8, wherein the synthesis gas has a pressure between approximately 10 bar and approximately 85 bar.

12. The method of claim 8, wherein the solvent has a pressure between approximately 20 bar and approximately 140 bar.

13. The method of claim 8, comprising directing the synthesis gas to the one or more membrane contactors directly from a water gas shift reactor.

14. A system, comprising:
an absorption unit configured to selectively remove carbon dioxide and hydrogen sulfide from a synthesis gas;
one or more membrane contactors disposed within the absorption unit to provide an absorption interface between the synthesis gas and a solvent, wherein each of the one or more membrane contactors comprise a physical absorption membrane configured to absorb the carbon dioxide and hydrogen sulfide from the synthesis gas;
a gas turbine configured to combust the synthesis gas after absorption of the carbon dioxide and hydrogen sulfide;
a solvent regeneration unit configured to remove the carbon dioxide and the hydrogen sulfide from the solvent; and
a heat recovery generation system configured to convert exhaust gas discharged from the gas turbine to steam for the solvent regeneration unit.

15. The system of claim 14, wherein each physical absorption membrane of the one or more membrane contactors comprises a thermoplastic.

16. The system of claim 14, wherein the absorption unit comprises a single vessel containing the one or more membrane contactors.

17. The system of claim 14, wherein the absorption unit is configured to selectively remove the hydrogen sulfide and the carbon dioxide from the synthesis gas in a single unit operation to produce a sweetened synthesis gas stream containing primarily hydrogen and a rich solvent stream containing the carbon dioxide and the hydrogen sulfide.

18. The system of claim 14, comprising a second absorption unit disposed in parallel or in series with the absorption unit to selectively remove carbon dioxide and hydrogen sulfide from the synthesis gas.

* * * * *